June 3, 1941.                    H. HILL                    2,244,395
                ENCLOSING HOUSING FOR ELECTRICAL DEVICES
                            Filed Oct. 26, 1937
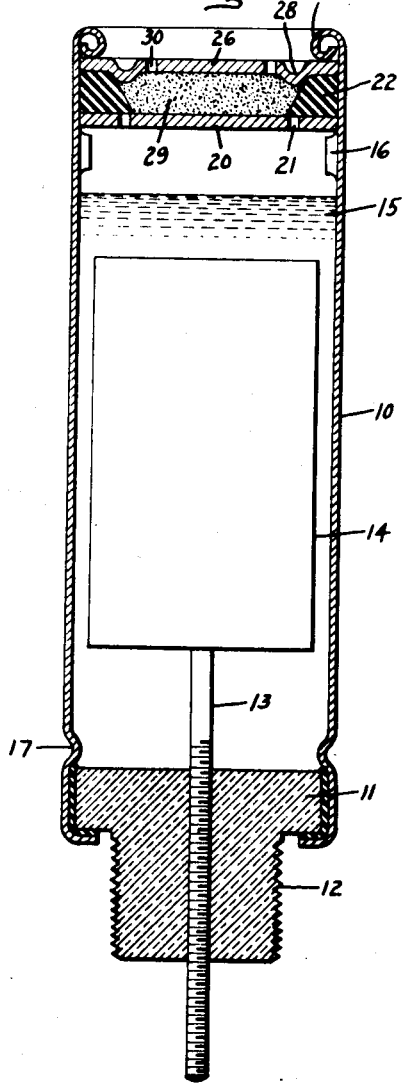
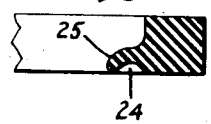
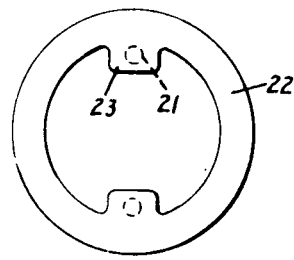
Inventor:
Hermann Hill,
by Harry E. Dunham
His Attorney.

Patented June 3, 1941

2,244,395

UNITED STATES PATENT OFFICE 2,244,395

ENCLOSING HOUSING FOR ELECTRICAL DEVICES

Hermann Hill, Coblenz, Germany, assignor, by mesne assignments, to General Electric Company, a corporation of New York Application October 26, 1937, Serial No. 171,111
In Germany November 7, 1936

6 Claims. (Cl. 220—44)

The present invention relates to an enclosing housing for an electrical device and has for a particular object the provision of an improved enclosing housing construction for an electrical device of the type employing a filling or impregnating material which, due to abnormal heating or other conditions, may develop undesirable excess pressures within the enclosing housing.

Another object of the invention is the provision in a housing for an electrical device of the type above specified, of an improved construction and arrangement of parts for sealing the housing under normal conditions to prevent escape of the filling or impregnating material and for insuring proper relief of excess pressures under abnormal conditions. Other objects and the details of that which I believe to be novel and my invention will become apparent from the following description and the claims appended thereto taken in conjunction with the accompanying drawing in which an exemplary embodiment of the invention is illustrated as applied to a condenser of the so-called wet electrolytic type. Although particularly suited for condensers of the type illustrated, the present invention may be utilized to advantage in the construction of enclosing housings for dry electrolytic condensers, batteries, lightning arresters, and other electrical devices employing a filling or impregnating material which may cause abnormal development of excessive pressures in the enclosing housing.

In the drawing, Fig. 1 shows in longitudinal cross-section a wet electrolytic condenser housing construction embodying my improved sealing and venting means; and Figs. 2, 3, and 4 illustrate some of the modified forms of packing ring which may be employed for carrying out my invention.

The illustrated condenser has an open-ended tubular casing 10 of aluminum or other suitable metal which may be employed as the cathode of the condenser. The lower end of the casing has a closure element 11 which may be constructed of any suitable insulation material and which has an external threaded boss 12 for mounting of the condenser in a well known manner. Through the closure element 11 there extends a post 13 for supporting the anode element 14 which may be of any suitable form, the lower end of post 13 being threaded for the making of electric connection thereto. The interior of casing 10 is substantially filled with a suitable liquid electrolyte 15.

On the inner wall of casing 10, spaced from the upper end thereof, are provided shoulder means which may be in the form of lugs, as illustrated at 16, or may be in the form of a spun groove, as illustrated at 17. Resting on the lugs 16 is a disk-like closure member 20 having one or more vent apertures 21 which, in the case of a considerable number of such apertures, may be arranged in a circle. Externally of closure member 20 and extending around the periphery thereof is a packing ring 22 which is constructed of resilient material such as, for example, natural or synthetic rubber, and which is constructed to have a special cross-section for the carrying out of the present invention.

In Fig. 1 the ring 22 is illustrated as having a trapezoid cross-section such that the upper face thereof and the base thereof, which latter is in contact with closure member 20, are parallel to each other with the outer face of the ring parallel to and pressing against the wall of casing 10 and the inner face of the ring disposed at an acute angle to the base thereof. With this construction, the inner portion of the ring tapers toward its lower inner edge to form a foot which is relatively more flexible than the outer main body portion of the ring and which foot is increasingly flexible toward the inner lower edge thereof. This inner flexible foot portion of the ring is so arranged that it extends inwardly over aperture or apertures 21. Also, this flexible foot portion may extend completely around the ring, as is preferable in the case of a large number of apertures 21 arranged in a circle, or, in case only a small number of apertures 21 are employed, may be in the form of inwardly extending projections or lugs 23 occurring at spaced points around the inner face of the ring, as indicated diagrammatically in Fig. 4. The packing ring may be further adapted to the pressures to be expected by providing notches or grooves 24 in the base of the ring, as indicated in Fig. 2, to render the inwardly projecting tapered foot portion more flexible. Also, instead of employing the trapezoid cross-section construction of Figs. 1 and 2, the flexible foot portion may be provided by forming the ring with an inwardly projecting flange 25, such as shown in Fig. 3, of less thickness than the main body portion of the ring and, if desired, also provided with the grooves or notches 24.

Exteriorly of packing ring 22 is a second disk-like closure member 26 which is held in place by means of crimping, spinning, or rolling over of the end of casing 10, as indicated at 27. By this means the packing ring is clamped between closure members 20 and 26 with the base of the ring forced into liquid-tight engagement with the outer surface of member 20. Outer closure member 26 is grooved or notched, as indicated at 28, the groove or notches being so formed and arranged in accordance with the shape of ring 22 that the groove or notches press outwardly on the upper portion of the inner face of the ring to force the outer face of the ring into liquid-tight engagement with the wall of casing 10. Thus, with the ring in liquid-tight engagement with both the wall of the casing and the outer surface of closure member 20 around the periphery thereof, the junction between member 20 and the casing is sealed against the escape of liquid electrolyte therethrough. As will be evident from the drawing, the pressure exerted by closure element 26 and the groove or notches 28 therein is directed only against the outer main body portion of the packing ring, leaving the inner tapered foot portion free. As a result of this arrangement the tapered foot portion normally presses resiliently against the outer surface of closure member 20 in liquid-tight closing relation to apertures 21, but in case of the development of excess pressures within casing 10 due to abnormal heating or other conditions, the flexible foot is free to flex or yield to permit the escape of gases and liquid vapors through apertures 21. Within the space interiorly of ring 22 and between closure members 20 and 26 there is provided a body of suitable liquid absorbing material 29 which serves to prevent the escape of liquid from that space while at the same time permitting gases to pass therethrough to the vent openings 30 provided in the outer closure member 26.

From the foregoing description it will be seen that by my invention I have provided an improved simple and inexpensive construction for normally closing the end of casing 10 to prevent the leakage of liquid electrolyte, while at the same time providing for the escape of gases and liquid vapors in case undesirable excess pressures develop within the casing. It will be evident also that the packing ring 22 may assume various forms so that it may serve the double purpose of a seal for the junction between closure member 21 and casing 10 and of a valve for controlling the escape of gases or vapors through the vent apertures 21 and 30.

What I claim as new and desire to secure by Letters Patent of the United States, is:

1. In a housing for an electrical device of the type capable abnormally of developing excess pressure within the housing, the combination of a tubular casing having an open end, an inner closure disk disposed in said casing spaced from said open end and having a vent aperture, an outer closure disk disposed adjacent said open end of the casing and having a vent aperture, a packing ring disposed between said disks around the periphery thereof, and means clamping said ring between said disks in sealing relation to the junction between said inner disk and the walls of said casing, said packing ring having a flexible resilient portion extending in closing relation over the vent aperture in said inner disk and pressing resiliently against the surface of the inner disk around said last mentioned aperture.

2. In a housing for an electrical device of the type capable abnormally of developing excess pressure within the housing, the combination of a tubular casing having an open end, a pair of closure disks at the open end of said casing, the inner of which disks has a vent aperture, a resilient packing ring disposed between said disks around the periphery thereof, means clamping said ring between said disks in sealing relation to the junction between the inner of the disks and the walls of the casing, said ring having a flexible portion resiliently pressing against the outer surface of said inner disk in closing relation to the vent aperture in the inner disk, a body of liquid absorbing material disposed in the compartment formed interiorly of said ring between said disks and means for venting said compartment.

3. In a housing for an electrical device of the type capable abnormally of developing excess pressure within the housing, the combination of a tubular casing having an open end, a pair of disk-like closure members in said open end of the casing, a packing ring of resilient material disposed between and extending around the periphery of said members, and means forcing said members into clamping engagement with said ring, one of said members having a shoulder engaging and pressing substantially radially outward on said ring to force the ring into sealing engagement with the walls of the casing around the periphery of the inner of said members.

4. In a housing for an electrical device of the type capable abnormally of developing excess pressure within the housing, the combination of a tubular casing having an open end, a pair of closure disks in said open end of the casing, the inner of said disks having a plurality of vent apertures arranged around the disk in spaced relation to the periphery thereof, a packing ring disposed between and extending around the periphery of said disks, means forcing said disks into clamping engagement with said ring and forcing said ring into sealing relation with the junction between the walls of said casing and the inner of said disks, said ring having resilient flexible portions normally pressing resiliently against the outer surface of said inner disk in closing relation to said vent apertures, means for venting the space interiorly of said ring and between said disks, and a body of liquid absorbing material disposed in said space.

5. In a housing for an electric device having means capable abnormally of developing excess pressure within the housing, the combination of a tubular casing having an open end, two relatively stiff non-deformable closure members disposed adjacent said open end and having a cross-sectional area substantially equal to the inner cross-sectional area of said casing, a sealing element of deformable resilient material between said members and having an outer portion extending around in proxmity to the peripheries of said members, means clamping said sealing element between said members in sealing relation to the junction between the inner one of said members and the walls of said casing, and vent means for the casing including a vent aperture in said inner one of said members and a flexible resilient portion of said sealing element extending in closing relation to said aperture, which said portion of the sealing element is arranged to yield to permit escape of gases through said aperture upon development of abnormally excessive pressure within said casing.

6. In a housing for an electric device having means capable abnormally of developing excess pressure within the housing, a tubular metallic casing having an open end and shoulder means spaced from said open end, two relatively stiff non-deformable closure members disposed between said shoulder means and said open end of the casing, each of which members has a vent aperture and has a cross-sectional area substantially equal to that of the interior of the casing, a sealing element of deformable resilient material between said members and having an outer portion extending around in proximity to the peripheries of said members, and means including a spun-over portion of said open end of the casing cooperative with said shoulder means to clamp said sealing element between said members and force the outer portion of the sealing element into sealing relation to the junction between the walls of said casing and the innermost one of said members, said sealing element having a flexible resilient portion yieldably closing the said vent aperture in said innermost member, which said portion of the sealing element is arranged to yield to permit escape of gases through said last mentioned aperture upon development of abnormally excessive pressure within said casing.

HERMANN HILL